United States Patent
Loccufier et al.

(10) Patent No.: US 8,110,610 B2
(45) Date of Patent: *Feb. 7, 2012

(54) AMINE CO-INITIATORS FOR RADIATION CURABLE COMPOSITIONS

(75) Inventors: Johan Loccufier, Mortsel (BE); Roland Claes, Mortsel (BE)

(73) Assignee: Agfa Graphics N.V., Mortsel (BE)

( * ) Notice: Subject to any disclaimer, the term of this patent is extended or adjusted under 35 U.S.C. 154(b) by 233 days.

This patent is subject to a terminal disclaimer.

(21) Appl. No.: 12/445,561

(22) PCT Filed: Dec. 17, 2007

(86) PCT No.: PCT/EP2007/064025
§ 371 (c)(1),
(2), (4) Date: Apr. 14, 2009

(87) PCT Pub. No.: WO2008/074759
PCT Pub. Date: Jun. 26, 2008

(65) Prior Publication Data
US 2010/0048756 A1    Feb. 25, 2010

(30) Foreign Application Priority Data
Dec. 21, 2006 (EP) .................................. 06126800

(51) Int. Cl.
C08F 2/46 (2006.01)
C08F 4/00 (2006.01)
C09D 4/00 (2006.01)
C09D 11/10 (2006.01)

(52) U.S. Cl. ........... 522/10; 522/14; 522/28; 522/34; 522/39; 522/53; 522/57; 522/59; 522/65; 522/181; 522/182; 522/75

(58) Field of Classification Search .............. 522/10, 522/14, 16, 26, 28, 64, 181, 182, 183, 34, 522/39, 53, 57, 59, 65, 75
See application file for complete search history.

(56) References Cited

U.S. PATENT DOCUMENTS

| | | | |
|---|---|---|---|
| 3,845,056 A | 10/1974 | Robson et al. | |
| 3,963,771 A | 6/1976 | Robson et al. | |
| 4,045,416 A | 8/1977 | Robson et al. | |
| 4,390,453 A | 6/1983 | Eichler | |
| 5,128,391 A | 7/1992 | Shustack | |
| 5,147,750 A * | 9/1992 | Nakanishi | 430/108.22 |
| 6,172,129 B1 * | 1/2001 | Fan et al. | 522/167 |
| 6,177,144 B1 * | 1/2001 | Kranig et al. | 427/519 |
| 6,310,115 B1 | 10/2001 | Vanmaele et al. | |
| 6,541,535 B1 * | 4/2003 | Blum et al. | 522/35 |
| 6,673,851 B2 * | 1/2004 | Moy et al. | 522/173 |
| 6,762,257 B1 | 7/2004 | Lewandowski et al. | |
| 6,814,791 B2 | 11/2004 | Moore et al. | |
| 6,896,937 B2 * | 5/2005 | Woudenberg | 427/511 |
| 7,104,642 B2 | 9/2006 | Takabayashi | |
| 7,183,367 B2 * | 2/2007 | Gani et al. | 526/287 |
| 7,309,757 B2 * | 12/2007 | Liu et al. | 528/392 |
| 7,452,921 B2 * | 11/2008 | Herlihy et al. | 522/8 |
| 7,524,565 B2 * | 4/2009 | Gould et al. | 428/441 |
| 7,709,545 B2 * | 5/2010 | Hoyle et al. | 522/14 |
| 2003/0021961 A1 | 1/2003 | Ylitalo et al. | |
| 2003/0073757 A1 | 4/2003 | Moy et al. | |

FOREIGN PATENT DOCUMENTS

| | | |
|---|---|---|
| DE | 3 126 433 A1 | 1/1983 |
| DE | 19835849 A1 | 2/2000 |
| DE | 19835867 A1 | 2/2000 |
| EP | 0036075 A1 | 9/1981 |
| EP | 0161805 A1 | 11/1985 |
| EP | 1 616 922 A1 | 1/2000 |
| EP | 1 147 098 A1 | 8/2000 |
| EP | 1 668 084 A1 | 3/2005 |
| EP | 1 616 899 A1 | 1/2006 |
| EP | 1 671 805 A2 | 6/2006 |
| EP | 1 705 229 B1 | 10/2008 |
| WO | WO 95/10552 A1 | 4/1995 |
| WO | WO 99/07746 A1 | 2/1999 |
| WO | WO 00/30856 A1 | 6/2000 |
| WO | WO 00/44734 A1 | 8/2000 |
| WO | WO 03/091288 A1 | 11/2003 |
| WO | WO 03/095506 A1 | 11/2003 |
| WO | WO 03/102034 A1 | 12/2003 |
| WO | WO 2004/046204 A1 | 6/2004 |
| WO | WO 2004/067451 A1 | 8/2004 |
| WO | WO 2004/068023 A1 | 8/2004 |
| WO | WO 2004/099262 A1 | 11/2004 |
| WO | WO 2008/074759 A1 | 6/2008 |

OTHER PUBLICATIONS

PCT International Search Report (Mar. 10, 2008).
European Patent Office, International Search Report in International Application No. PCT/EP2007/064024 (May 27, 2008).

* cited by examiner

Primary Examiner — Susan W Berman
(74) Attorney, Agent, or Firm — Leydig, Voit & Mayer, Ltd.

(57) ABSTRACT

A radiation curable composition comprising a curable compound, a photo-initiator and a co-initiator, characterized in that said co-initiator is a oligomer or polymer having a repeating unit, said repeating unit comprising at least two tertiary amines, and said polymer being prepared by the polycondensation of di- or oligofunctional Michael acceptors with mono- or oligofunctional aliphatic primary amines or with di- or oligofunctional aliphatic secondary amines or with a mixture thereof.

24 Claims, No Drawings

AMINE CO-INITIATORS FOR RADIATION CURABLE COMPOSITIONS

FIELD OF THE INVENTION

The present invention relates to radiation curable compositions comprising a new type of co-initiator. The new co-initiator can be used in radiation curable compositions such as varnishes, lacquers and printing inks, e.g. radiation curable inkjet inks.

BACKGROUND OF THE INVENTION

A radiation curable composition, e.g. a radiation curable inkjet ink, typically comprises a photo-initiator. Upon exposure of said composition, the photo-initiator initiates the curing, i.e. the polymerization, of said composition.

Free radical photo-initiators can be classified as Norrish Type I or Norrish Type II photo-initiators. A Type I photo-initiator undergoes photo-cleavage to yield free radicals while a Type II photo-initiator produces free radicals through an abstraction process, in most cases hydrogen-abstraction. While a Type I photo-initiator produces free radicals through a unimolecular bond cleavage reaction, a Type II photo-initiator forms free radicals in the presence of a second molecule, the so called co-initiator also referred to as polymerization synergist.

A first problem for free-radical polymerization processes is the inhibition of the polymerization, i.e. decrease of the curing speed, by oxygen. Inhibition by oxygen results not only in a decreased overall curing speed, but can also result in an inhomogeneous curing, e.g. poor surface curing resulting in tacky surfaces.

Amines are well known in the art as co-initiators for Type II photo-initiators and to suppress oxygen inhibition of free radical polymerization processes. The role of amines in curing systems has been reviewed, for example, by R. S. Davidson in "Radiation Curing in Polymer Science and Technology, Volume III", edited by J. P. Fouassier et al., Elsevier Applied Science, 1993, pages 153-176.

A second problem, associated with co-initiators, e.g. amines, present in a radiation curable composition, may arise when unreacted co-initiator remains in the cured composition. Hydrogen transfer from an amine co-initiator to a Type II photo-initiator is rarely quantitative. The unreacted co-initiator remains mobile in the cured composition and may adversely affect the physical properties of the cured composition or may diffuse out of the cured composition. If the radiation curable composition is printed upon food packaging, extraction of the unreacted co-initiator, also referred to as extractables, into the food may cause health risks. One way to obtain less extractables may be the improvement of the reactivity of the co-initiators, in order to avoid unreacted co-initiators after curing. A decrease of the diffusion out of unreacted co-initiators may be another way to provide less extractables. Decreasing the diffusion out may be realized by providing the co-initiators with a polymerizable group in order to co-polymerize the co-initiator upon curing or by increasing the molecular weight of the co-initiators.

U.S. Pat. Nos. 3,845,056, 3,963,771 and 4,045,416 disclose amine acrylates, produced by the reaction of a polyacrylate ester, preferably a diacrylate ester, with an amine having at least one hydrogen attached to the nitrogen atom. Said amine acrylates, comprising polymerizable groups, provide a fast curing speed to radiation curable coating compositions.

EP-A 1 147 098 discloses multi-functional reactive amine acrylates having a low viscosity, prepared by the reaction of multifunctional (meth)acrylates with cyclic secondary amines. These amine acrylates provide a good curing speed, a higher thermal stability and less extractables to radiation curable compositions.

In WO 03/091288 a new class of amine co-initiators, in combination with Type I and/or Type II photo-initiators, is disclosed, said amine co-initiators being trialkylamines having a total of 10 to about 36 carbon atoms, wherein at least one alkyl group has a chain length of at least 8 carbon atoms. According to WO 03/091288, said amine co-initiators, when used in combination with a Type II photo-initiator, provide less extractables after curing compared to conventional amines as e.g. N-methyl-N,N-diethanolamine.

WO 99/07746 discloses a radiation curable composition containing a radiation curable resin, a photo-initiator and an amine as co-initiator, characterized in that said amine is a compound containing at least one tertiary amino group and wherein at least one substituent of the tertiary amino group is an aliphatic chain containing at least one electron-withdrawing group. Said amine compound is preferably a branched, highly branched or star-shaped dendrimer comprising at least one tertiary amino group. Said co-initiators, in combination with Type II photo-initiators provide a higher curing speed and less extractables.

EP-A 1 616 922 discloses a radiation curable composition containing a radiation curable resin, a photo-initiator and a co-initiator characterized in that said co-initiator comprises a dendritic polymer core with at least one co-initiating functional group, e.g. aliphatic or aromatic amines, as an end group on the polymer core. The radiation curable compositions according to EP-A 1 616 922 are characterized by a high curing speed and a low amount of extractables.

Increasing the molecular weight of the co-initiator, to decrease the amount of extractables, may however result in a too high viscosity of the curable composition.

Other problems associated with curable compositions, in particular inkjet inks, are photoyellowing and adhesion.

Photoyellowing is a discoloration effect seen after curing due to decomposition of photoinitiators and/or co-initiators. This can be especially well observed for cyan and white radiation curable inks containing large amounts of isopropylthioxanthone type photoinitiators, which after printing and curing result in a greenish cyan respectively a yellowish white colour. EP-A 0 036 075 and DE-A 3 126 433 disclose the use of specific mixtures of photoinitiators in the photopolymerisation of ethylenically unsaturated compounds to obtain polymers characterized by extremely low levels of yellowing.

The behaviour and interaction of a UV-curable ink on a substantially non-absorbing ink-receiver was found to be quite complicated compared to water-based inks on absorbent ink-receivers. In particular, a good and controlled spreading of the ink on the ink-receiver proved to be problematic and adhesion problems were observed on using different types of non-absorbing ink-receivers. One way to approach these problems is to develop and use different ink sets for different types of substrates, but this is a not a preferred solution since changing inks in the printer and print head is very time consuming and not really a viable solution for an industrial printing environment. The adhesion may be influenced by using different polymerizable compounds, surfactants, binders and/or organic solvents. U.S. Pat. No. 6,814,791 discloses inkjet printing methods wherein the ink composition comprising methyl acetate as a solvent is printed upon substrates of propylene and ethylene. The use of a well-chosen solvent usually results in partial swelling or dissolution of the substrate surface which leads to better adhesion, but can also cause problems of blocked nozzles in the printhead due to evaporation of solvent. It is known that the adhesion of radiation curable inks can also be promoted on polyvinyl chloride substrates when one or more monomers are used that are suitable for the swelling of the PVC substrate and which are selected from the group consisting of tetrahydrofurfuryl acrylate, 1,6-hexanediol diacrylate and N-vinyl caprolactam. However, adhesion on polycarbonate substrates is promoted when one or more monomers are used that are suitable for the swelling of the polycarbonate substrate and which are selected from the group consisting of 2-phenoxylethyl acrylate, 2-(2-ethoxyethoxy)ethyl acrylate and polyethyleneglycol diacrylate. As a consequence one has to make the "best possible" mixture of monomers suitable for both the swelling of polyvinyl chloride substrates and polycarbonate substrates. Often such a compromise, whereby acceptable adhesion is obtained on several ink-receivers by making a complex mixture of ingredients, has a negative effect on the dispersion stability of a pigmented inkjet ink. Adhesion problems have also been associated with shrinkage of an ink-layer after radiation curing. In this aspect, cationic inks have been regarded to be superior in comparison to free radical polymerizable inks. EP-A 1 705 229 discloses cationically polymerizable inkjet inks exhibiting good adhesion and storage stability. U.S. Pat. No. 6,310,115 discloses radiation curable inkjet ink compositions comprising radiation curable monomers containing vinylether and acrylate functions, which can be cured both by cationic polymerization and free radical polymerization. In free radical inkjet inks, high amounts of monofunctional acrylates are thought to be advantageous for adhesion. Both EP-A 1 668 084 and U.S. Pat. No. 7,104,642 address adhesion and disclose discloses radiation curable inkjet inks comprising monofunctional acrylate compounds in is amounts of 65% by mass or more. Instead of adapting the inkjet inks, it has become the general approach to modify the surface chemistry of the ink-receiver either by a pre-treatment such as plasma or corona treatment or by applying a suitable surface layer, a so-called primer. Corona discharge treatment and plasma treatment increase the cost, complexity and maintenance of the equipment used to process the substrates. Substrates may contain significant impurities or irregularities that may interfere with the treatment of the substrate, and hence not result to the uniform spreading and adhesion of ink. The other possibility is the application of a primer prior to jetting the inkjet inks. Generally, the surface layer is coated and dried or cured before jetting the inkjet ink as, for example, in the inkjet printing process in EP-A 1 671 805 and US 2003 021 961, but it can also remain a wet, un-cured surface layer as in WO 00/30856.

OBJECTS OF THE INVENTION

It is an object of the present invention to provide a radiation curable composition comprising a new class of co-initiators in combination with either a Norrish Type I photo-initiator or a Norrish Type II photo-initiator or a combination thereof, said compositions having an acceptable viscosity, a high curing speed and a low amount of extractables, the latter opening possibilities for inkjet printing on food packaging.

It is also an object of the present invention to provide a new class of co-initiators prepared by a process which enables controlling the molecular weight of the co-initiators to prevent a too high viscosity of the curable composition comprising said oligomeric or polymeric co-initiators.

A still another object of the present invention is to provide curable compositions characterized by low levels of yellowing and an improved adhesion on plastic substrates, more specifically on poly-olefines.

These and other objects of the present invention will become apparent form the description hereinafter.

SUMMARY OF THE INVENTION

The objects of the present invention are realized with a radiation curable composition comprising a curable compound, a photo-initiator and a new class of co-initiators, characterized in that said co-initiator is a oligomer or polymer having a repeating unit comprising at least two tertiary amines, said polymer being prepared by the polycondensation of a di- or oligofunctional Michael acceptor with an aliphatic primary amine according to Formula I,

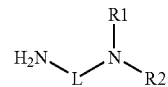

Formula I wherein

L is a divalent linking group, positioning the primary and tertiary amine in a 1-3 to 1-10 position with the proviso that the tertiary amine is an aliphatic amine;

R1 and R2 represent an optionally substituted alkyl group, an optionally substituted alkenyl group, an optionally substituted alkynyl group, an optionally substituted (hetero)alkaryl group;

R1 and R2 may represent the necessary atoms to form a ring;

R1 or R2 may represent the necessary atoms to form a ring with any of the atoms of L;

and/or with a secondary amine according to Formula II,

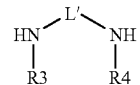

Formula II wherein

L' is a divalent linking group positioning the two secondary amines in a 1-3 to 1-10 position, with the proviso that both amines are aliphatic;

R3 and R4 independently represent an optionally substituted alkyl group, an optionally substituted alkenyl group, an optionally substituted alkynyl group, an optionally substituted (hetero)alkaryl group;

R3 and R4 may represent the necessary atoms to form a ring; and

R3 or R4 may represent the necessary atoms to form a ring with any of the atoms of L'.

Preferred embodiments of the present invention are defined in the independent claims.

DETAILED DESCRIPTION OF THE INVENTION

The radiation curable composition comprises at least three components: (i) a curable compound, (ii) a photo-initiator and (iii) a co-initiator. Said composition may further comprise one or more inhibitor(s), surfactant(s), colorant(s), dispersant(s) or dispersion synergist(s). The radiation curable composition is preferably a radiation curable inkjet ink, more preferably an UV curable inkjet ink.

Co-initiators

The co-initiator is a polymer or oligomer having a repeating unit comprising at least two tertiary amines, and said polymer being prepared by the polycondensation of di- or oligofunctional Michael acceptors with mono- or oligofunctional aliphatic primary amines or with di- or oligofunctional aliphatic secondary amines or with a mixture thereof. An oligomer is a polymer comprising 2 to 4 repeating units.

The co-initiator is a polymer or oligomer having a repeating unit comprising at least two tertiary amines, and said polymer being prepared by the polycondensation of a di- or oligofunctional Michael acceptor with an aliphatic primary amine according to Formula I,

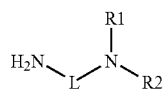

Formula I wherein
L is a divalent linking group, positioning the primary and tertiary amine in a 1-3 to 1-10 position with the proviso that the tertiary amine is an aliphatic amine;
R1 and R2 represent an optionally substituted alkyl group, an optionally substituted alkenyl group, an optionally substituted alkynyl group or an optionally substituted (hetero)alkaryl group;
R1 and R2 may represent the necessary atoms to form a ring;
R1 or R2 may represent the necessary atoms to form a ring with any of the atoms of L;
and/or a secondary amine according to Formula II,

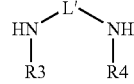

Formula II wherein
L' is a divalent linking group positioning the two secondary amines in a 1-3 to 1-10 position, with the proviso that both amines are aliphatic;
R3 and R4 independently represent an optionally substituted alkyl group, an optionally substituted alkenyl group, an optionally substituted alkynyl group or an optionally substituted (hetero)alkaryl group;
R3 and R4 may represent the necessary atoms to form a ring; and
R3 or R4 may represent the necessary atoms to form a ring with any of the atoms of L'.

An aliphatic amine means an amine wherein all substituents are aliphatic or comprises an aliphatic group directly attached to the nitrogen of the amine. The substituents may comprise an aromatic moiety with the proviso that the aromatic moiety is not directly attached to the nitrogen of the amines (e.g. alkaryl groups).

The divalent linking groups L and L' in Formula I and II comprise at least one carbon atom. A divalent linking group L or L' comprising one carbon atom positions the two amines in Formula I and II in a 1-3 position. Preferably, the divalent linking groups L and L' are an aliphatic C2 to C6 divalent linking group.

The alkyl group referred to in Formula I and II means all variants possible for each number of carbon atoms in the alkyl group i.e. for three carbon atoms: n-propyl and isopropyl; for four carbon atoms: n-butyl, isobutyl and tertiary butyl; for five carbon atoms: n-pentyl, 1,1-dimethyl-propyl, 2,2-dimethylpropyl and 2-methyl-butyl etc.

Preferably, R1 to R4 referred to in Formula I and II independently represent a C1 to C5 alkyl group, more preferably a C1 to C3 alkyl group.

Preferably R1 and R2 may represent the necessary atoms to form a five or six membered ring.

Preferably R3 and R4 may represent the necessary atoms to form a six membered ring.

Primary Amines

Some examples of primary amines comprising an additional aliphatic tertiary amine and having a structure according to Formula I are shown in Table 1.

TABLE 1

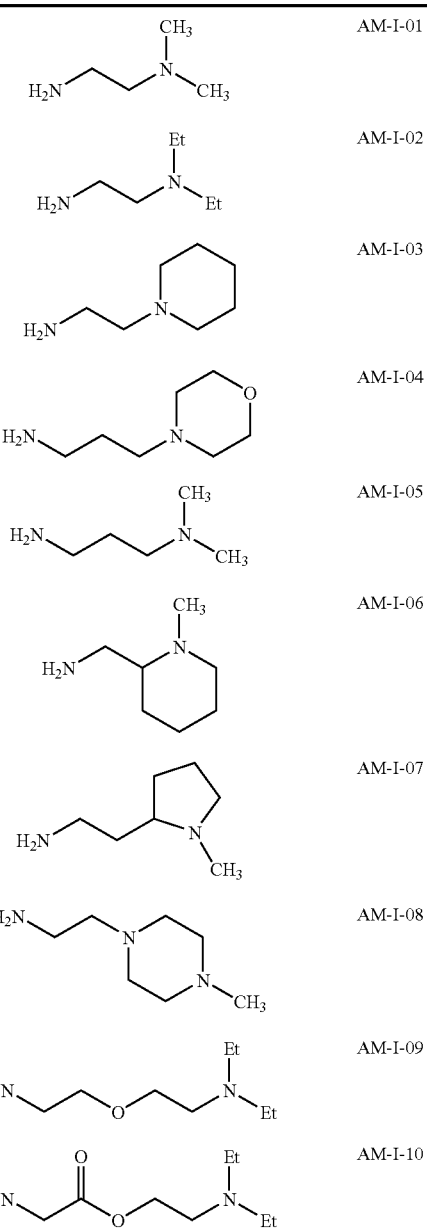

TABLE 1-continued

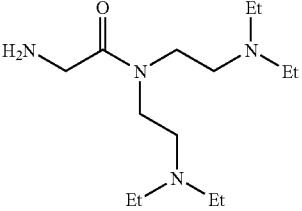
AM-I-11

Secondary Amines

Some examples of difunctional secondary amines having a structure according to Formula II are shown in Table 2.

TABLE 2

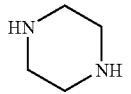 AM-II-01

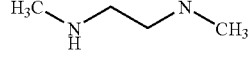 AM-II-02

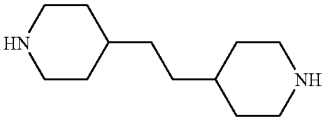 AM-II-03

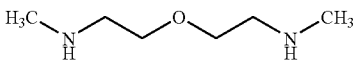 AM-II-04

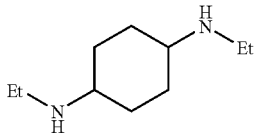 AM-II-05

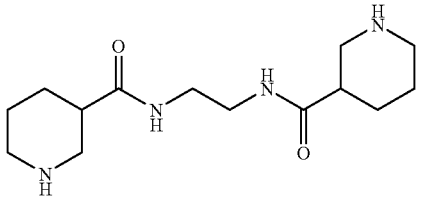 AM-II-06

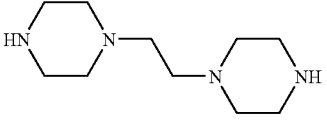 AM-II-07

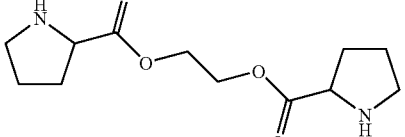 AM-II-08

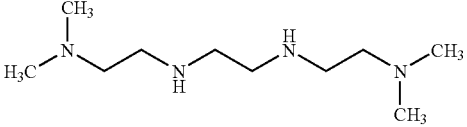 AM-II-09

TABLE 2-continued

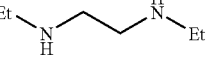 AM-II-10

Michael Acceptors

The Michael acceptors are selected from the group consisting of: (meth)acrylates, (meth)acrylamides, vinyl sulfones, vinyl phosphonates, vinyl sulfonates, vinyl sulfonamides, maleimides, vinyl nitriles, vinyl ketones, vinyl aldehydes and vinyl sulfoxides.

Preferably (meth)acrylates and vinylsulfones are used.

More preferably difunctional (meth)acrylate and vinylsulfones are used.

Some examples of Michael acceptors are shown in Table 3.

TABLE 3

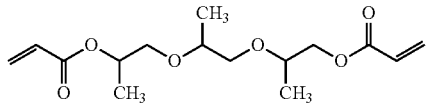 MI-01

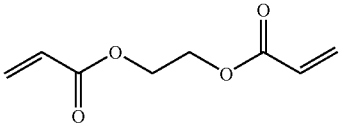 MI-02

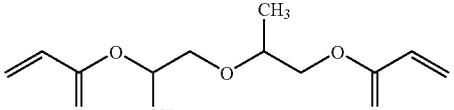 MI-03

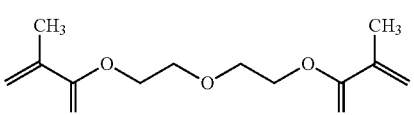 MI-04

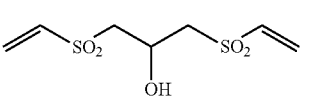 MI-05

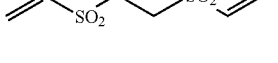 MI-06

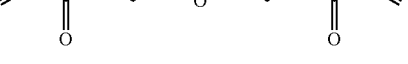 MI-07

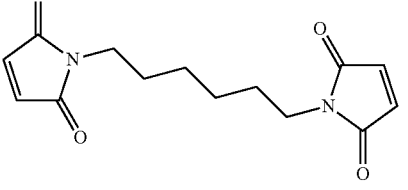 MI-08

TABLE 3-continued

| | |
|---|---|
| [structure: bisphenol A diacrylate with ethoxy linkers] | MI-09 |
| [structure: N,N'-bis(acryloyl) diamine] | MI-10 |
| [structure: bis-cyanoacrylate diester] | MI-11 |
| [structure: acrylate-ethyl-sulfonyl-vinyl] | MI-12 |
| [structure: maleimide-ethyl acrylate] | MI-13 |
| [structure: maleimide-ethoxyethyl vinyl sulfone] | MI-14 |
| [structure: bis(vinylsulfonyl-acetamido) propane] | MI-15 |

The co-initiators are prepared by the polycondensation, by a Michael addition reaction, of di- or oligofunctional Michael acceptors with mono- or oligofunctional aliphatic primary amines or with di- or oligofunctional aliphatic secondary amines or with a mixture thereof. The 1,4-addition of a nucleophilic compound, such as a primary or secondary amine, to an activated double bond, also called a Michael acceptor, is considered as a Michael addition reaction. A double bond is considered as an activated double bond or a Michael acceptor, when it is substituted by at least one electron withdrawing group. Preferred electron withdrawing groups are selected from the group consisting of a nitrile, an ester, an amide, a sulfonamide, a sulfonate, a sulfone, a sulfoxide, a phosphonate, an aldehyde and a ketone.

It is known for those skilled in the art that the degree of polymerization for the condensation of two difunctional monomers depends on the stochiometric imbalance. A detailed discussion on polymers prepared by polycondensations can be found in "Synthetic Methods in Step-Growth Polymers" edited by Rogers M. E. and Long T. E. (Wiley-Interscience, 2003, ISBN 0-471-38769). A further theoretical discussion can be found in Polymer Chemistry, The Basic Concepts, Chapter 5, Condensation or Step-Growth Polymerization, by Hiemenz P. C. (Marcel Decker, 1984, ISBN 0-8247-7082-X). This stochiometric imbalance, i.e. in the present invention the molar ratio of the amine(s) to the Michael acceptor is used to control the molecular weight and as result the viscosity of the curable compositions comprising the co-initiators according to the present invention.

The use of multifunctional Michael acceptors and/or multifunctional amines in a poly-condensation polymerization leads to branched or even hyperbranched polymeric structures. To avoid crosslinking these polymerisations have to be performed under subcritical conditions. Such subcritical conditions are realized by making use of a stoichiometric imbalance.

When difunctional (meth)acrylates are used as Michael acceptors with difunctional amines, the molar ratio (meth)acrylate/amine is preferably between 2/1.2 and 2/1.8.

The residual reactive end groups of the formed oligomer or polymer can be "endcapped", i.e. a reaction with a nucleophilic compound, preferably an primary or secondary amine.

It has been found that a co-initiator according to the present invention provides an improved adhesion on plastic substrates, more specifically on poly-olefines such as polypropylene, to a curable composition. It has also been found that the improvement of adhesion is further related to the pKa value of the amine used to prepare the co-initiator: the higher the pKa, the better the co-initiator performs as far as adhesion improvement is concerned. However, co-initiators according to this embodiment, having a high $pK_a$, have a tendency to influence the colloid stability of a radiation curable ink negatively, depending on the dispersant used. It has been found that an optimal balance between adhesion performance and colloid stability is achieved when the pKa value of the secondary amines used in the preparation of the co-initiators is between 7.0 and 9.5. Therefore, co-initiators comprising a piperazine or morpholine moiety, having an intermediate $pK_a$ between the $pK_a$ of classical aromatic co-initiators, such as 4-dimethylamino-benzoic acid ethyl ester, and aliphatic co-initiators, known in the prior art such as Craynor CN386, are particularly preferred, showing an optimal balance between adhesion performance and colloid stability.

The molecular weight (Mw) of the co-initiators is preferably between 1000 and 50 000, more preferably between 2400 and 25 000, most preferably between 4000 and 20 000.

Some examples of co-initiators are shown in Table 4.

TABLE 4

| | |
|---|---|
| [structure: COINI-01 polymer with diethylaminoethyl-amino-propanoate repeating unit] | COINI-01 |

TABLE 4-continued
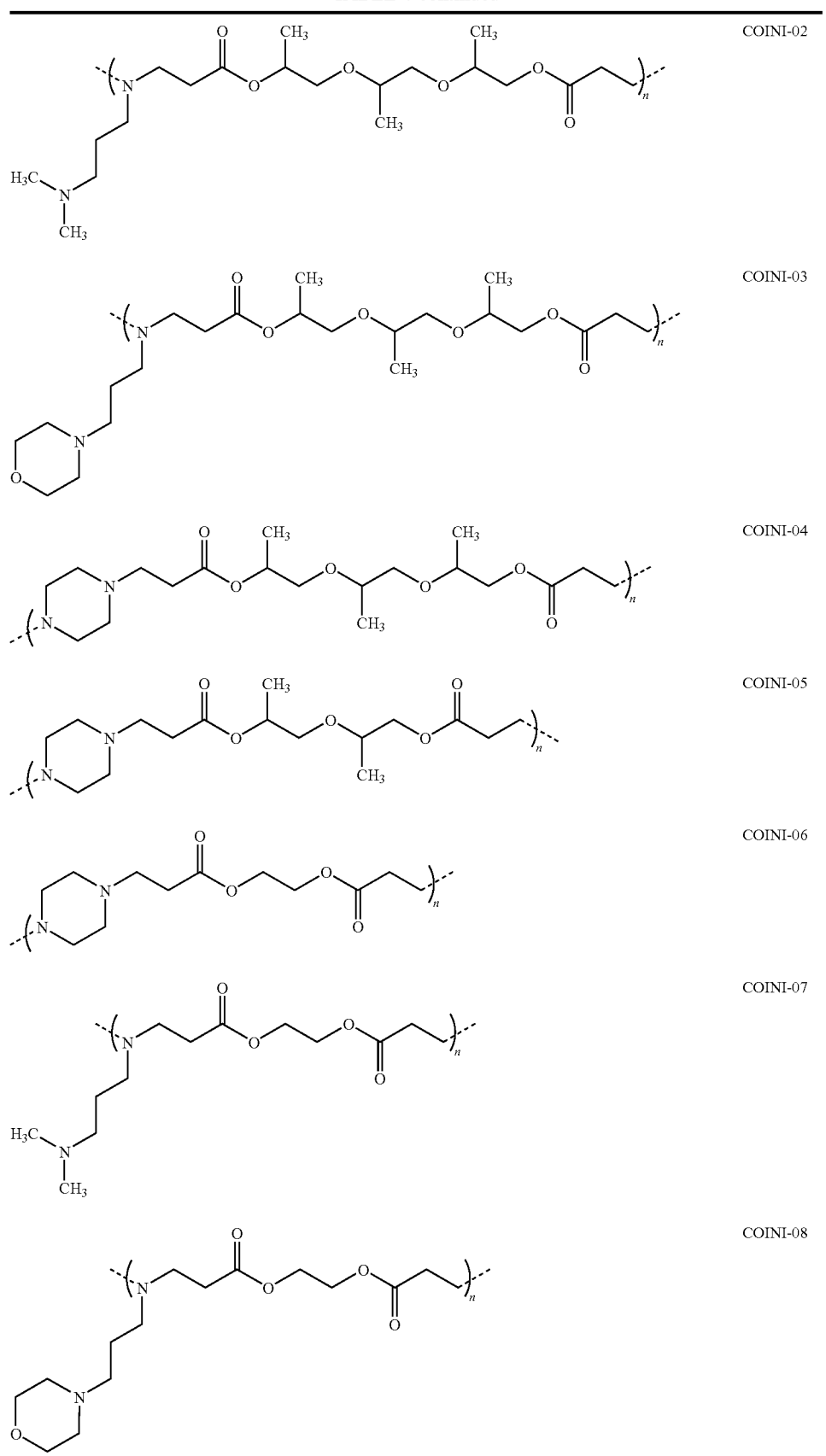

TABLE 4-continued
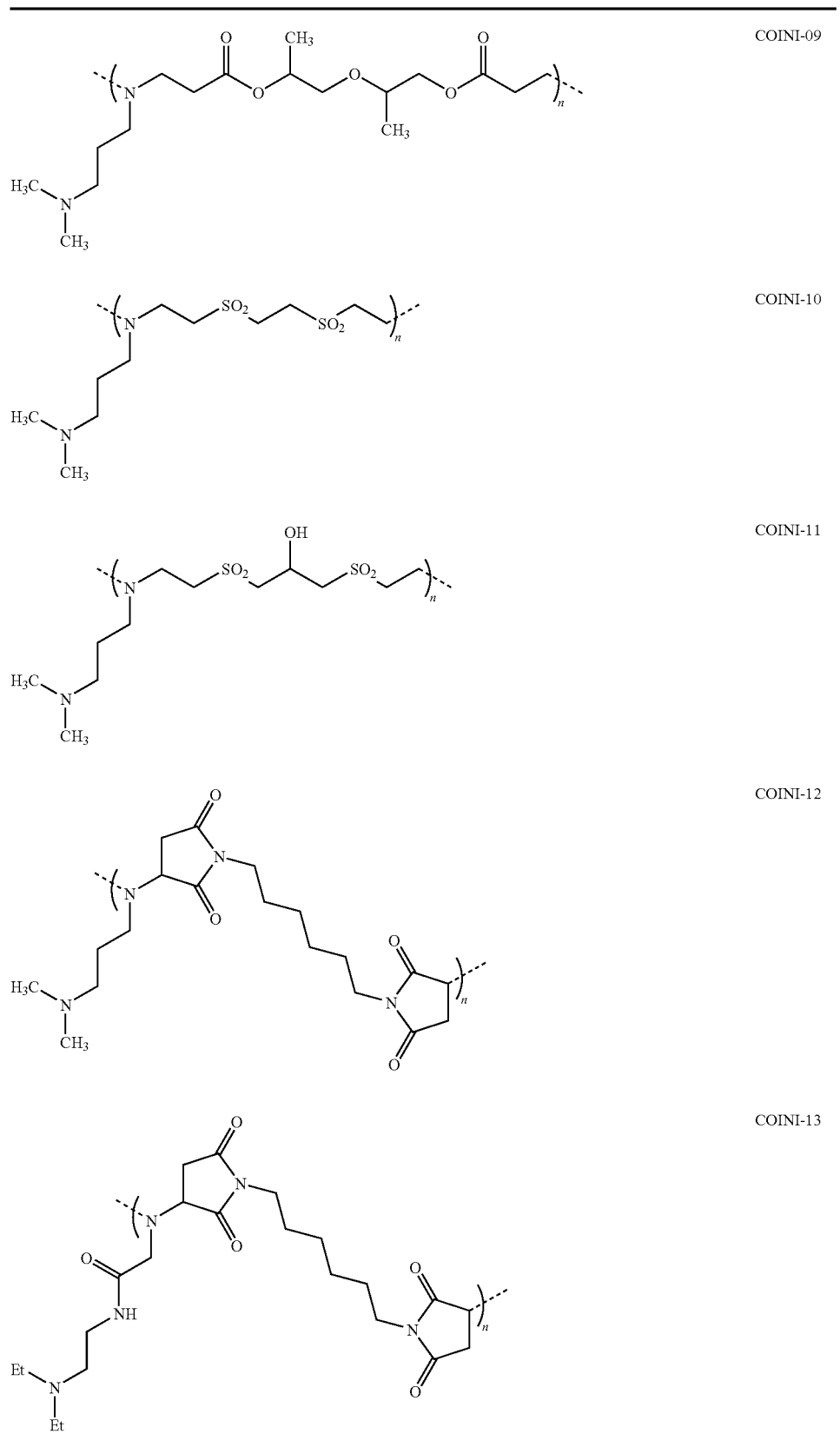

TABLE 4-continued

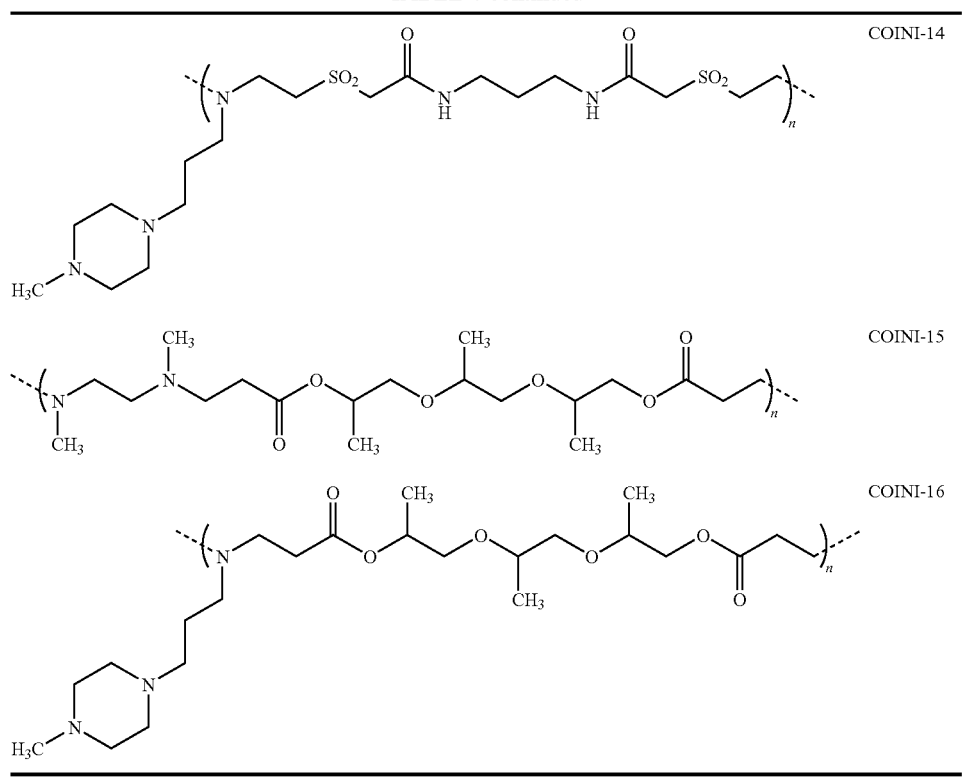

The radiation curable composition may comprise two or more different co-initiators according to the present invention or may comprise one or more co-initiators according to the present invention in combination with one or more other co-initiator known in the art. Examples of one or more other co-initiators are (1) tertiary aliphatic amines such as methyldiethanolamine, dimethyl ethanolamine, triethanolamine, triethylamine and N-methylmorpholine; (2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate; (3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate); and (4) amides or ureas. Preferred is a combination of is the co-initiators according to the present invention and an aminobenzoate type co-initiator, e.g. ethyl-4-dimethylaminobenzoate. Particularly preferred is a combination of the co-initiator of the present invention and Genocure EPD and Genopol AB-1 both from Rahn AG. Also particularly preferred is a combination of the co-initiator of the present invention and the co-initiators disclosed in the unpublished EP-A 06 124 637 and EP-A 06 124 635 (both filed 23 Nov. 2006).

The total co-initiator amount in the radiation curable composition is preferably from 0.01 to 20% by weight, more preferably from 0.05 to 15% by weight, most preferably from 0.1 to 10% by weight relative to the total weight of said curable composition.

Photo-Initiators

The radiation curable composition of the present invention comprises one or more photo-initiators. The photo-initiator typically initiates the polymerization upon exposure of said composition. Upon absorption of said radiation, the photo-initiator produces free radicals, thereby inducing polymerization of the curable compounds (monomers, oligomers or (pre) polymers) of said composition. When polyfunctional monomers or oligomers are present as curable compounds, said free radicals may also initiate cross linking.

The photo-initiator may be a Norrish Type I photo-initiator, a Norrish Type II photo-initiator or a combination thereof.

A preferred Norrish type I-initiator is selected from the group consisting of benzoinethers, benzil ketals, α,α-dialkoxy-acetophenones, α-hydroxyalkylphenones, α-aminoalkylphenones, acylphosphine oxides, acylphosphine sulphides, α-haloketones, α-halosulfones and α-halophenylglyoxalates. Particularly preferred are acyl or bisacyl phosphine oxides.

A preferred Norrish type II-initiator is selected from the group consisting of benzophenones, thioxanthones, 1,2-diketones and anthraquinones.

Suitable Type I and Type II photo-initiators are disclosed by J. V. Crivello et al. in "Photoinitiators for Free Radical, Cationic & Anionic Photopolymerisation 2$^{nd}$ edition", Volume III of the Wiley/SITA Series In Surface Coatings Tecnology, edited by G. Bradley and published in 1998 by John Wiley and Sons Ltd London, pages 276 to 294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6-trimethylbenzoyldiphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy-6-fluorone.

Suitable commercial photo-initiators include Irgacure 184, Irgacure 500, Irgacure 907, Irgacure 369, Irgacure 379, Irgacure 127, Irgacure 1700, Irgacure 651, Irgacure 819, Irgacure 1000, Irgacure 1300, Irgacure 1870, Darocur 1173, Darocur 2959, Darocur 4265 and Darocur ITX available from CIBA SPECIALTY CHEMICALS, Lucerin TPO available from BASF AG, Esacure KT046, Esacure KIP150, Esacure KT37 and Esacure EDB available from LAMBERTI, H-Nu 470 and H-Nu 470X available from SPECTRA GROUP Ltd., Genopol TX-1 from Rahn AG.

Since the photo-initiator generates radicals upon absorption of radiation, the photo-initiator is typically chosen as a function of the type of radiation used to cure the curable composition. If two or more types of radiation are used to cure the radiation curable composition, two or more types of photo-initiators may be present.

A preferred amount of initiator is preferably from 0.3 to 50% weight, more preferably from 1 to 25% by weight, most preferably form 2 to 15 percent by weight relative to the total weight of the radiation curable composition.

The radiation curable composition may comprise one or more sensitizers. Upon exposing said composition, the sensitizers may transfer energy to the photo-initiator(s) resulting in free radical formation. Suitable sensitizers include photoreducible xanthene, fluorene, benzoxanthene, benzothioxanthene, thiazine, oxazine, coumarin, pyronine, porphyrin, acridine, azo, diazo, cyanine, merocyanine, diarylmethyl, triarylmethyl, anthraquinone, phenylenediamine, benzimidazole, fluorochrome, quinoline, tetrazole, naphthol, benzidine, rhodamine, indigo and/or indanthrene dyes.

The amount of the sensitizer is preferably from 0.01 to 15% by weight, more preferably from 0.05 to 5% by weight relative of the total weight of said curable composition.

Radiation Curable Compositions

The co-initiator according to the present invention may be used in any radiation curable composition such as a coating composition, a sprayable composition, a printing ink, a varnish, a lacquer, an adhesive composition, a functional fluid such as a conductive fluid.

In a preferred embodiment the curable composition is a coating composition. The coating composition can be used for coating layers having different kind of functionalities, such as an image recording layer (e.g. for receiving an inkjet printed image), a primer, a varnish, and a lacquer.

In another preferred embodiment the curable composition is a printing ink or fluid. The printing ink comprises at least one colorant, while the printing fluid is substantially colourless.

The printing ink or fluid can be of any type known in the art, such as a flexo ink, screen ink or an offset ink, but preferably is an inkjet ink or fluid, most preferably a UV-curable ink or fluid.

The inkjet ink or fluid may be used in a colour printing application or can be used as functional fluids that are used for jetting of conductive layers, displays, biological and medical fluids, optical fluids et cetera.

For colour printing applications, the co-initiator of the present invention may be added to one or more radiation curable compositions depending on the inkjet printing method.

The inkjet printing method comprises at least one jetting step, but may comprise one or more jetting steps, and also may comprise one or more extra steps such as a coating step or a lamination step.

The co-initiator of the present invention may for instance be added to the composition which is used as a primer, one or more colour inks or a varnish or lacquer.

The co-initiator of the present invention may be added to at least one colour ink to ensure that the amount of extractables is limited. Therefore, the co-initiator of the present invention is preferably added to all inks of the inkjet ink set.

The co-initiator of the present invention has the advantage of delivering a cured ink layer from which only a very low amount of extractables can be extracted. Therefore, the use of the co-initiator of the present invention in a primer may be useful for jetting on a permeable substrate, in order to form a barrier layer on the substrate for a compound which could migrate from a composition on top of the primer. The co-initiator may also be used in a jettable fluid for forming a cured overcoat which prevents migration of a compound of the underlying cured compositions to the surface of the material.

Besides the photo-initiators and co-initiators described above the radiation curable inkjet ink further comprises a radiation curable compound and preferably at least one colorant, i.e. a pigment or dye. An inkjet fluid does not comprise a colorant. The radiation curable inkjet ink may further comprise one or more dispersant(s), dispersion synergist(s), inhibitor(s), surfactant(s).

The viscosity of the curable inkjet ink at a shear rate of 100 $s^{-1}$ and a jetting temperature between 25 and 70° C. is preferably lower than 35 mPa·s, more preferably lower than 15 mPa·s, most preferably between 2 and 10 mPa·s.

The curable pigment inkjet ink preferably does not contain an evaporable component, but sometimes, it can be advantageous to incorporate a small amount of an organic solvent in said inks to improve adhesion to the surface of the ink-receiver after UV-curing. In this case, the added solvent can be any amount in the range that does not cause problems of solvent resistance and VOC, and preferably between 0.1-10.0% by weight, more preferably between 0.1-5.0% by weight relative to the total weight of the curable pigment inkjet ink.

Curable Compounds

The curable compounds are typically monomers, oligomers or prepolymers or a combination thereof.

The monomers, oligomers and/or prepolymers comprise one, two, three or more polymerizable groups. A mixture of monomers, oligomers and/or prepolymers, having different amounts of polymerizable groups may be used.

The viscosity of the curable composition can be adjusted by varying the ratio between the monomers and oligomers.

Any polymerizable compound commonly known in the art may be employed. Particularly preferred for use as a radiation curable compound in the radiation curable inkjet ink are monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethyl-hexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, and caprolactam modified dipentaerythritol hexaacrylate, or an N-vinylamide such as, N-vinylcaprolactam or N-vinylformamide; or acrylamide or a substituted acrylamide, such as acryloylmorpholine.

Other suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and alkoxylated cyclohexanone dimethanol diacrylate.

Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other suitable trifunctional acrylates include propoxylated glycerine triacrylate and propoxylated trimethylolpropane triacrylat.

Other higher functional acrylates include di-trimethylolpropane tetraacrylate, dipentaerythritol pentaacrylate, ethoxylated pentaeryhtitol tetraacrylate, methoxylated glycol acrylates and is acrylate esters.

Furthermore, methacrylates corresponding to the above-mentioned acrylates may be used with these acrylates. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to an ink-receiver surface.

Furthermore, the inkjet inks may also contain polymerizable oligomers. Examples of these polymerizable oligomers include epoxy acrylates, aliphatic urethane acrylates, aromatic urethane acrylates, polyester acrylates, and straight-chained acrylic oligomers.

Suitable examples of styrene compounds are styrene, p-methylstyrene, p-methoxystyrene, β-methylstyrene, p-methyl-β-methylstyrene, α-methylstyrene and p-methoxy-β-methylstyrene.

Suitable examples of vinylnaphthalene compounds are 1-vinylnaphthalene, α-methyl-1-vinylnaphthalene, β-methyl-1-vinylnaphthalene, 4-methyl-1-vinylnaphthalene and 4-methoxy-1-vinylnaphthalene.

Suitable examples of N-vinyl compounds are N-vinylcarbazole, N-vinylpyrrolidone, N-vinylindole, N-vinylpyrrole, N-vinylphenothiazine, N-vinylacetoanilide, N-vinylethylacetoamide, N-vinylsuccinimide, N-vinylphthalimide, N-vinylcaprolactam and N-vinylimidazole.

Examples of vinyl ethers having at least one vinyl ether group include ethyl vinyl ether, n-butyl vinyl ether, isobutyl vinyl ether, octadecyl vinyl ether, cyclohexyl vinyl ether, butanediol divinyl ether, hydroxyl butyl vinyl ether, cyclohexane dimethanol monovinyl ether, phenyl vinyl ether, p-methylphenyl vinyl ether, p-methoxyphenyl vinyl ether, α-methylphenyl vinyl ether, β-methyl-isobutyl vinyl ether and β-chloroisobutyl vinyl ether, diethylene-glycol divinyl ether, triethylene glycol divinyl ether, n-propyl vinyl ether, isopropyl vinyl ether, dodecyl vinyl ether, diethylene glycol monovinyl ether, cyclohexanedimethanol divinyl ether, 4-(vinyloxy)butyl benzoate, bis[4-(vinyl oxy)butyl]adipate, bis[4-(vinyl oxy)butyl]succinate, 4-(vinyloxy methyl)cyclohexyl-methyl benzoate, bis[4-(vinyloxy)butyl]isophthalate, bis[4-(vinyl-oxymethyl)cyclohexylmethyl]glutarate, tris[4-(vinyloxy)-butyl]trimellitate,4-(vinyloxy)butyl stearate, bis[4-(vinyloxy)-butyl]hexanediylbiscarbamate, bis[4-(vinyloxy)methyl]-cyclohexyl]methyl]terephthalate, bis[4-(vinyloxy)methyl]cyclohexyl]methyl]isophthalate, bis[4-(vinyloxy)butyl](4-methyl-1,3-phenylene)-biscarbamate, bis[4-vinyloxy)butyl](methylene di-(4,1-phenylene)) biscarbamate and 3-amino-1-propanol vinyl ether.

A preferred class of monomers and oligomers which can be used in the curable compositions are vinyl ether acrylates such as those described in U.S. 6,310,115. Particularly preferred compounds are 2-(2-vinyloxyethoxy)ethyl acrylate and 2-(2-vinyloxy ethoxy)ethyl acrylate.

Colorants

The radiation curable inkjet ink preferably comprises at least one colorant. Colorants may be dyes, but are preferably pigments or a combination thereof. The pigment can also be a precipitated dye having at least one carboxylic acid group or a salt thereof.

The pigment can be black, white, cyan, magenta, yellow, red, orange, violet, blue, green, brown, mixtures thereof, and the like.

The pigment may be chosen from those disclosed by HERBST, Willy et al. "Industrial Organic Pigments, Production, Properties, Applications", $3^{rd}$ edition, Wiley-VCH, 2004 (ISBN 3527305769).

Particular preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 175, 180, 181, 185, 194 and 213.

Particular preferred pigments are C.I. Pigment Red 17, 22, 23, 41, 48:1, 48:2, 49:1, 49:2, 52:1, 57:1, 81:1, 81:3, 88, 112, 122, 144, 146, 149, 169, 170, 175, 176, 184, 185, 188, 202, 206, 207, 210, 216, 221, 248, 251, 254, 264 and 282.

Particular preferred pigments are C.I. Pigment Violet 1, 2, 19, 23, 32, 37 and 39.

Particular preferred pigments are C.I. Pigment Blue 15:1, 15:2, 15:3, 15:4, 16, 56, 61 and (bridged) aluminium phthalocyanine pigments.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments also include mixed crystals of the above particular preferred pigments. In mixed crystals, also referred to as solid solutions, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia Magenta RT-355-D from Ciba Specialty Chemicals, which is a mixed crystal of C.I. Pigment Violet 19 and C.I. Pigment Red 202. Under certain conditions different quinacridones mix with each other to form solid solutions For the black ink, suitable pigment materials include carbon blacks such as Regal 400R, Mogul L, Elftex 320 from Cabot Co., or Carbon Black FW18, Special Black 250, Special Black 350, Special Black 550, Printex 25, Printex 35, Printex 55, Printex 150T from DEGUSSA Co., and C.I. Pigment Black 7 and C.I. Pigment Black 11.

A neutral black inkjet ink can be obtained, for example, by mixing carbon black with a cyan, a magenta or a cyan and magenta pigment into the ink, as for example described in pending European patent application EP-A 1 593 718.

The inkjet application may also require one or more spot colours, for example for packaging inkjet printing or textile inkjet printing. Silver and gold are often desired colours for inkjet poster printing and point-of-sales displays. Particular preferred pigments are C.I. Pigment Metal 1, 2 and 3. Illustrative examples of the inorganic pigments include titanium oxide, barium sulfate, calcium carbonate, zinc oxide, lead sulfate, yellow lead, zinc yellow, red iron oxide (III), cadmium red, ultramarine blue, prussian blue, chromium oxide green, cobalt green, amber, titanium black and synthetic iron black. Titanium dioxide is a preferred pigment for a white ink.

Pigment particles in pigmented inkjet ink should be sufficiently small to permit free flow of the ink through the inkjet-printing device, especially at the ejecting nozzles. It is also desirable to use small particles for maximum colour strength and to slow down sedimentation.

The average particle size of the pigments in pigmented inkjet ink should be between 0.005 and 15 µm. Preferably, the average pigment particle size is between 0.005 and 5 µm, more preferably between 0.005 and 1 µm, particularly preferably between 0.005 and 0.3 µm and most preferably between 0.040 and 0.150 µm. Larger pigment particle sizes may be used as long as the objectives of the present invention are achieved.

However, the average pigment particle size for white inkjet inks comprising, for example, a $TiO_2$ pigment is preferably between 0.100 and 0.300 µm.

Dispersants

The radiation curable inkjet ink may further comprise a dispersant in order to obtain a stable dispersion of the pigment(s) in the inkjet ink.

Preferred dispersants are disclosed in the unpublished EP-A 06 122 098 (filed 11 Oct. 2006), paragraph [51] to [87].

Dispersion Synergists

The radiation curable inkjet ink may further comprise a dispersion synergist. A dispersion synergist is used for improving the dispersion quality and stability of the pigment dispersions in the inkjet ink. A mixture of dispersion synergists may be used to further improve dispersion stability.

The dispersion synergist usually consists of an anionic part and a cationic part. The anionic part of the dispersion synergist exhibit is often a certain molecular similarity with the colour pigment and the cationic part of the dispersion synergist consists of one or more protons and/or cations to compensate the charge of the anionic part of the dispersion synergist.

The curable magenta inkjet ink according to the present invention preferably contains a dispersion synergist.

Preferred dispersion synergyst are disclosed in the unpublished EP-As 05 111 356, 05 111 357, 05 111 358 and 05 111 360 (all filed 28 Nov. 2005).

Inhibitors

The radiation curable composition may also contain a polymerization inhibitor, also referred to as stabilizer. Suitable polymerization inhibitors include phenol type antioxidants, hindered amine light stabilizers, phosphor type antioxidants, hydroquinone monomethyl ether, hydroquinone, t-butylcatechol or pyrogallol.

Suitable commercial inhibitors are, for example, Sumilizer GA-80, Sumilizer GM and Sumilizer GS produced by Sumitomo Chemical Co. Ltd.; Genorad 16, Genorad 18 and Genorad 20 from Rahn AG; Irgastab UV10 and Irgastab UV22, Tinuvin 460 and CGS20 from Ciba Specialty Chemicals; Floorstab UV range (UV-1, UV-2, UV-5 and UV-8) from Kromachem Ltd, Additol S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 5% by weight, more preferably lower than 2.5% by weight relative the total weight of the inkjet ink composition.

Surfactants

The inkjet ink may contain at least one surfactant. The surfactant(s) can be anionic, cationic, non-ionic, or zwitterionic and are usually added in a total quantity less than 20 wt % based on the total weight of the inkjet ink and particularly in a total less than 10 wt % based on the total weight of the inkjet ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL 104, 104H, 440, 465 and TG available from AIR PRODUCTS & CHEMICALS INC.).

For non-aqueous inkjet inks preferred surfactants are selected from fluoro surfactants (such as fluorinated hydrocarbons) and silicone surfactants. The silicones are typically siloxanes and can be alkoxylated, polyether modified, polyether modified hydroxy functional, amine modified, epoxy modified and other modifications or combinations thereof. Preferred siloxanes are polymeric, for example polydimethylsiloxanes.

In a curable inkjet ink a fluorinated or silicone compound may be used as a surfactant, preferably a cross-linkable surfactant is used. Polymerizable monomers having surface-active effects include silicone modified acrylates, silicone modified methacrylates, acrylated siloxanes, polyether modified acrylic modified siloxanes, fluorinated acrylates, and fluorinated methacrylates. Polymerizable monomers having surface-active effects can be mono-, di-, tri- or higher functional (meth)acrylates or mixtures thereof.

The curable inkjet inks may be prepared by milling the pigment in the dispersion medium, preferably in the presence of a polymeric dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium oxide beads.

In the process of mixing, milling and dispersion, each process is performed with cooling to prevent build up of heat, and as much as possible under light conditions in which actinic radiation has been substantially excluded.

The curable pigment inkjet ink may contain more than one pigment, the inkjet ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50% by weight, excluding the milling media. The weight ratio of pigment over polymeric dispersant is 20:1 to 1:2.

The milling time can vary widely and depends upon the pigment, the selected mechanical means and residence conditions, the initial and desired final particle size, etc. In the present invention pigment dispersions with an average particle size of less than 150 nm may be prepared.

After milling is completed, the milling media is separated from the milled particulate product (in either a dry or liquid dispersion form) using conventional separation techniques, such as filtration, sieving through a mesh screen, and the like. Often the sieve is built into the mill, e.g. for a bead mill. The milled pigment concentrate is preferably separated from the milling media by filtration.

In general it is desirable to make the inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

In preparing the inkjet ink, it is preferred that one or more degassing steps are performed to remove air or gas bubbles from the ink. Degassing is preferably performed by heating and/or reduced pressure. The degassing step(s) can be performed on the concentrated pigment dispersion and/or on the final inkjet ink composition.

Printing Means

The curable inkjet ink may be jetted by one or more printing heads ejecting small droplets of ink in a controlled manner through nozzles onto an ink-receiver surface, which is moving relative to the printing head(s).

A preferred printing head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the printing head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet printing heads can be used and include various types, such as a continuous type and thermal, electrostatic and acoustic drop on demand type.

At high printing speeds, the inks must be ejected readily from the printing heads, which puts a number of constraints on the physical properties of the ink, e.g. a low viscosity at the jetting temperature, which may vary from 25° C. to 110° C., a surface energy such that the printing head nozzle can form the necessary small droplets, a homogenous ink capable of rapid conversion to a dry printed area.

The inkjet printing head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet printing heads or multiple staggered inkjet printing heads which cover the entire width of the ink-receiver surface. In a single pass printing process the inkjet printing heads usually remain stationary and the ink-receiver surface is transported under the inkjet printing heads.

Curing Means

The radiation curable composition, preferably the radiation curable inkjet ink, can be cured by exposing to actinic radiation and/or by electron beam curing. Preferably the curing is performed by an overall exposure to actinic radiation or by an overall electron beam curing.

The curing means may be arranged in combination with the print head of the inkjet printer, travelling therewith so that the curable liquid is exposed to curing radiation very shortly after been jetted.

In such an arrangement it can be difficult to provide a small enough radiation source connected to and travelling with the print head. Therefore, a static fixed radiation source may be employed, e.g. a source of curing UV-light, connected to the radiation source by means of flexible radiation conductive means such as a fibre optic bundle or an internally reflective flexible tube.

Alternatively, the actinic radiation may be supplied from a fixed source to the print head by an arrangement of mirrors including a mirror upon the print head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

The radiation source is preferably a ultraviolet radiation source. Ultraviolet radiation or light is also referred to as UV-radiation or UV-light. Any UV-light source, as long as part of the emitted light is absorbed by the photo-initiator or the photo-initiator system, may be employed as a radiation source, such as a high or low pressure mercury lamp, a cold cathode tube, a black light, an ultraviolet LED, an ultraviolet laser or a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the examples were readily available from standard sources such as Aldrich Chemical Co. (Belgium) and Acros (Belgium) unless otherwise specified.

DPGDA is a difunctional acrylate monomer available from CYTEC SURFACE SPECIALTIES.

Craynor CN386 is an amine modified acrylate synergist from SARTOMER.

Darocur TPO is a type I photo-initiator from CIBA SPECIALTY CHEMICALS.

Genocure ITX is a type II photo-initiator from RAHN AG.

Genorad 16 is a stabilizer voor UV-curable compositions available from RAHN AG.

PBlue15:4 is the cyan pigment Hostaperm Blue P-BFS available from CLARIANT.

Solsperse 39000 is a hyperdispersant available from NOVEON.

Solsperse 5000 is a dispersion synergist available from NOVEON.

Solsperse 35000 is a hyperdispersant available from NOVEON.

Byk UV3510 is a surfactant available from BYK CHEMIE GMBH.

BYK333 is a surfactant available from BYK CHEMIE GMBH.

SR9003 is SARTOMER 9003, a propoxylated neopentyl glycol diacrylate from SARTOMER.

SFBlue15:3 is the pigment Sunfast Blue 15:3 from SUN CHEMICALS CORPORATION.

Measurements Methods

Curing speed and viscosity were used to evaluate the UV curable inkjet inks.

Curing speed: the percentage of the maximum output of the lamp was taken as a measure for curing speed or sensitivity. The lower the number the higher the curing speed. A sample was considered fully cured at the moment scratching with a Q-tip caused no visual damage.

Viscosity: the viscosity of the curable inkjet inks were measured with a Brookfield DV-II+ at 25° C. and a shear rate RPM.

Photoyellowing: the photoyellowing effect of a sample is evaluated by measuring the b*-value of a coating of the composition. The compositions were coated using a bar coater and a 10 μm wired bar. Each coated layer was cured on a Fusion DRSE-120 conveyer, equipped with a Fusion VPS/1600 lamp (D-bulb), which transported the samples under the UV-lamp on a conveyer belt at a speed of 20 m/min. The coating was done on a white PE-paper. The b*-value of the colour difference indication method specified in CIE (Commission International de l'Eclairage) was measured 24 hours after coating with a spectrophotometer (Gretag SPM50). In this case, the measurement was carried out under conditions of light source D50, provision of no light source filter, absolute white as reference white, and angle of visibility 2°. The effect of yellowing was studied in a composition comprising a cyan pigment. The b*-value of the cyan pigmented coating is measured: the less negative the b*-value is, the more yellow the resulting colour of the coating has become by the effect of the photo-initiating system.

Adhesion: Adhesion is evaluated by a cross-cut test according to the international standard IS02409:1992(E) using a Braive No.1536 Cross Cut Tester from BRAIVE INSTRUMENTS with a spacing of 1 mm between cuts and using a weight of 600 g, in combination with a Tesatape™ 4104 PVC tape. The evaluation was made in accordance with the classification described below.

Classification:

0=The edges of the cuts are completely smooth: none of the squares of the lattice is detached (=perfect adhesion).

1=Detachment of small flakes of the coating at the intersections of the cuts. A cross-cut area not greater than 5% is affected.

2=The coating has flaked along the edges and/or at the intersections of the cuts. A cross-cut area greater than 5%, but not significantly greater than 15%, is affected.

3=The coating has flaked along the edges of the cuts partly or wholly in large ribbons, and/or it has flaked partly or wholly on different parts of the squares. A cross-cut area significantly greater than 15%, but not significantly greater than 35%, is affected.

4=The coating has flaked along the edges of the cuts in large ribbons, and/or some of the squares has detached partly or wholly. A cross-cut area significantly greater than 35%, but not significantly greater than 65%, is affected.

5=Any degree of flaking that cannot even be classified by classification 4.

Molecular Weight (Mw) of the co-initiators: the molecular weight of the oligomeric or polymeric co-initiators according to the present invention was determined using size exclusion chromatography on a set of 2 oligopore-columns (30×0.75 cm, from Polymer Labs) using tetrahydrofuran as eluent at a temperature of 40° C. and a flow rate of 1 ml/min. Polystyrene standards, having an Mw from 28 500 to 580 were used. A Refractive Index-detection was used. 10 mg of each polymer according to the present invention was dissolved in 10 ml tetrahydrofuran and 100 μl of each sample was injected.

Example 1

Synthesis Co-initiators Wherein Michael Acceptor is a bis-acrylate

The co-initiators were prepared by the polycondensation of a bis-acrylate with a primary amine (scheme 1) or with a secondary amine (scheme 2).

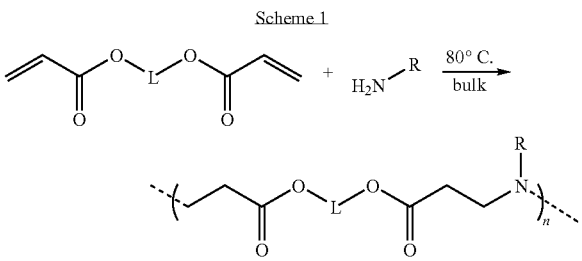

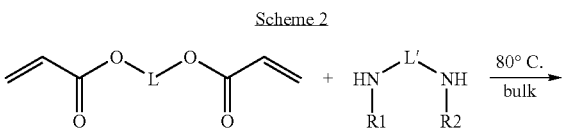

-continued

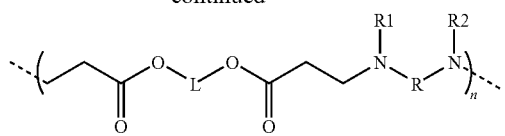

0.2 moles of the bis-acrylate was heated to 80° C. in the presence of BHT as stabilizer. The amine, the amount of which according to the molar ratio bis-acrylate/amine in Table 5, was added over one hour. The polymerization reaction was allowed to continue for 4 hours at 80° C., followed by cooling the reaction mixture to room temperature. The molecular weight (Mw), measured as described above, of the co-initiators is also shown in Table 5.

TABLE 5

| | acrylate | amine | molar ratio acrylate/amine | $M_w$ |
|---|---|---|---|---|
| COINI-01 | bis-acrylate structure | $H_2N$-CH$_2$CH$_2$-N(Et)$_2$ | 2/1.4 | 5300 |
| COINI-02 | bis-acrylate structure | $H_2N$-CH$_2$CH$_2$-N(Et)$_2$ | 2/1.2 | 4450 |
| COINI-03 | bis-acrylate structure | $H_2N$-(CH$_2$)$_3$-N(CH$_3$)$_2$ | 2/1.8 | 15600 |
| COINI-04 | bis-acrylate structure | $H_2N$-(CH$_2$)$_3$-N(CH$_3$)$_2$ | 2/1.6 | 8400 |
| COINI-05 | bis-acrylate structure | $H_2N$-(CH$_2$)$_3$-N(CH$_3$)$_2$ | 2/1.4 | 6000 |
| COINI-06 | bis-acrylate structure | $H_2N$-(CH$_2$)$_3$-N(CH$_3$)$_2$ | 2/1.2 | 5200 |
| COINI-07 | bis-acrylate structure | piperazine | 2/1.8 | 20800 |
| COINI-08 | bis-acrylate structure | piperazine | 2/1.6 | 9750 |
| COINI-09 | bis-acrylate structure | piperazine | 2/1.4 | 6800 |

TABLE 5-continued

| | acrylate | amine | molar ratio acrylate/amine | $M_w$ |
|---|---|---|---|---|
| COINI-10 | acrylate with two CH₃ groups and two ether linkages | H₂N-propyl-morpholine | 2/1.8 | 6900 |
| COINI-11 | acrylate with two CH₃ groups and two ether linkages | H₂N-propyl-morpholine | 2/1.6 | 5950 |
| COINI-12 | acrylate with two CH₃ groups and two ether linkages | H₂N-propyl-morpholine | 2/1.4 | 5500 |
| COINI-13 | acrylate with two CH₃ groups and two ether linkages | H₂N-propyl-morpholine | 2/1.2 | 4600 |
| COINI-14 | ethylene glycol diacrylate | H₂N-propyl-morpholine | 2/1.4 | 4600 |
| COINI-15 | acrylate with CH₃ and ether linkage | H₂N-propyl-N(CH₃)₂ | 2/1.2 | 5200 |
| COINI-16 | acrylate with CH₃ and ether linkage | piperazine (HN-NH) | 2/1.2 | 2400 |
| COINI-17 | ethylene glycol diacrylate | H₂N-propyl-N(CH₃)₂ | 2/1.2 | 3800 |
| COINI-18 | ethylene glycol diacrylate | H₂N-propyl-N(CH₃)₂ | 2/1.6 | 5400 |
| COINI-19 | acrylate with two CH₃ groups and two ether linkages | H₃C-piperazine-propyl-NH₂ | 2/1.4 | 1289 |

Example 2

This example illustrates the synthesis of a co-initiator according to the present invention wherein the Michael acceptor is a divinylsulfone, the amine is a primary amine and the reactive end group of the polymer is "endcapped" with diethylamine. The co-initiator is prepared according to scheme 3.

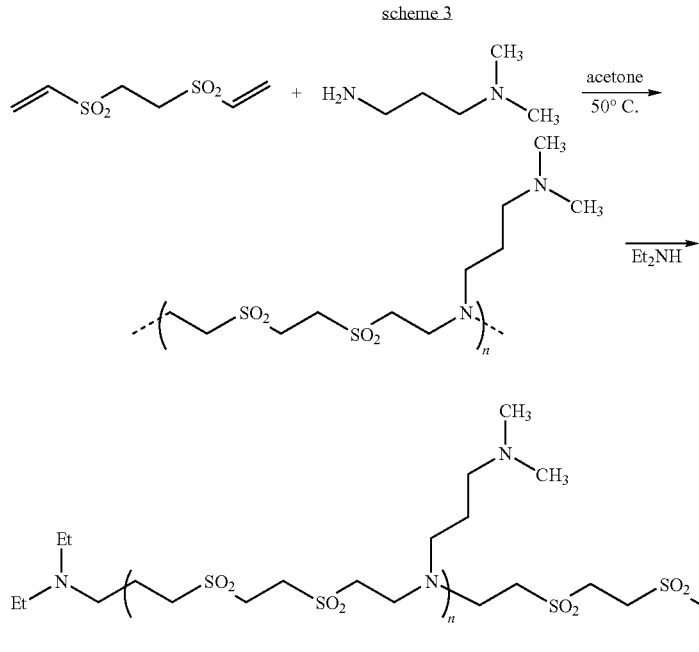

scheme 3

17.7 g (84 mmoles) of 1,2-Bis(vinylsulfonyl)ethane was dissolved in 100 ml acetone. 200 mg BHT was added as stabilizer. The reaction mixture was heated to 50° C. 6.0 g (58.8 mmoles) of 1-(dimethylamino)-3-aminopropane was added dropwise, while the reaction mixture was kept at 50° C. The reaction was allowed to continue at 50° C. Upon polymerization, the polymer precipitated from the reaction mixture. Two times 25 ml dimethylacetamide was added to solubilize the polymer. The reaction was allowed to continue over night at room temperature. The reaction mixture was heated to 50° C. and 12.3 g (0.17 mol) of diethylamine was added. The reaction was allowed to continue for another 4 hours at room temperature. The reaction mixture was evaporated under reduced pressure. The oily residue was dissolved in 250 ml methylene chloride and extracted twice with 190 ml water. The organic fraction was dried over $MgSO_4$ and evaporated under reduced pressure. 28.1 g of the polymer was isolated. The molecular weight of the polymer, expressed as weight average molecular weight, determined by size exclusion chromatography, was 7400.

Example 3

This example illustrates the high curing speed of inventive inkjet inks comprising a type II photo-initiator.

Preparation of Inkjet Inks INV-01 to INV-18 and COMP-01

TABLE 6

| wt % of: | COMP-01 | INV-01 | INV-02 | INV-03 | INV-04 | INV-05 |
|---|---|---|---|---|---|---|
| SR9003 | 40.00 | 40.0 | 40.00 | 40.00 | 40.00 | 40.00 |
| Genocure ITX | 5.00 | 5.00 | 5.00 | 5.00 | 5.00 | 5.00 |
| SFBlue15:3 | 2.00 | 2.00 | 2.00 | 2.00 | 2.00 | 2.00 |

TABLE 6-continued

| | | | | | | |
|---|---|---|---|---|---|---|
| Solsperse 39000 | 2.00 | 2.00 | 2.00 | 2.00 | 2.00 | 2.00 |
| Solsperse 5000 | 0.50 | 0.50 | 0.50 | 0.50 | 0.50 | 0.50 |
| BYK 333 | 0.03 | 0.03 | 0.03 | 0.03 | 0.03 | 0.03 |
| Craynor CN386 | 10.00 | X | x | x | x | X |
| COINI-01 | x | 12.00 | x | x | x | X |
| COINI-02 | x | X | 13.50 | x | x | X |
| COINI-03 | x | X | x | 9.50 | x | X |
| COINI-04 | x | X | x | X | 10.40 | X |
| COINI-05 | x | X | x | x | x | 11.60 |
| DPGDA | 40.47 | 38.47 | 36.97 | 40.97 | 40.07 | 38.87 |

| | INV-06 | INV-07 | INV-08 | INV-09 | INV-10 | INV-11 |
|---|---|---|---|---|---|---|
| SR9003 | 40.00 | 40.0 | 40.00 | 40.00 | 40.00 | 40.00 |
| Genocure ITX | 5.00 | 5.00 | 5.00 | 5.00 | 5.00 | 5.00 |
| SFBlue15:3 | 2.00 | 2.00 | 2.00 | 2.00 | 2.00 | 2.00 |
| Solsperse 39000 | 2.00 | 2.00 | 2.00 | 2.00 | 2.00 | 2.00 |
| Solsperse 5000 | 0.50 | 0.50 | 0.50 | 0.50 | 0.50 | 0.50 |
| BYK 333 | 0.03 | 0.03 | 0.03 | 0.03 | 0.03 | 0.03 |
| COINI-06 | 13.20 | X | x | x | x | X |
| COINI-07 | x | 18.20 | x | x | x | X |
| COINI-08 | x | X | 10.10 | x | x | X |
| COINI-09 | x | X | x | 11.30 | x | X |
| COINI-10 | x | X | x | x | 10.50 | X |
| COINI-11 | x | X | x | x | x | 11.30 |
| DPGDA | 37.27 | 32.27 | 40.37 | 39.17 | 39.97 | 39.17 |

TABLE 6-continued

|  | INV-12 | INV-13 | INV-14 | INV-15 | INV-16 | INV-17 |
|---|---|---|---|---|---|---|
| SR9003 | 40.00 | 40.0 | 40.00 | 40.00 | 40.00 | 40.00 |
| Genocure ITX | 5.00 | 5.00 | 5.00 | 5.00 | 5.00 | 5.00 |
| SPBlue15:3 | 2.00 | 2.00 | 2.00 | 2.00 | 2.00 | 2.00 |
| Solsperse 39000 | 2.00 | 2.00 | 2.00 | 2.00 | 2.00 | 2.00 |
| Solsperse 5000 | 0.50 | 0.50 | 0.50 | 0.50 | 0.50 | 0.50 |
| BYK 333 | 0.03 | 0.03 | 0.03 | 0.03 | 0.03 | 0.03 |
| COINI-12 | 12.50 | X | x | x | x | X |
| COINI-13 | x | 14.10 | x | x | x | X |
| COINI-14 | x | X | 8.40 | x | x | X |
| COINI-15 | x | X | x | 12.70 | x | X |
| COINI-16 | x | X | x | x | 10.70 | X |
| COINI-17 | x | X | x | x | x | 8.60 |
| DPGDA | 37.97 | 36.37 | 42.07 | 37.77 | 39.77 | 41.87 |

|  | INV-18 |
|---|---|
| SR9003 | 40.00 |
| Genocure ITX | 5.00 |
| SFBlue15:3 | 2.00 |
| Solsperse 39000 | 2.00 |
| Solsperse 5000 | 0.50 |
| BYK 333 | 0.03 |
| COINI-18 | 6.90 |
| DPGDA | 43.57 |

The inkjet ink formulation of Table 6 were coated on an unsubbed 100 μm PET substrate, using a bar coater and a 10 μm wired bar. Each coated layer was cured on a Fusion DRSE-120 conveyer, equipped with a Fusion VPS/1600 lamp (D-bulb), which transported the samples under the UV-lamp on a conveyer belt at a speed of 20 m/min. The curing speed was determined.

The viscosity and the curing speed of the inkjet inks are summarized in Table 7.

TABLE 7

| Sample | viscosity at 25° C. | curing speed |
|---|---|---|
| COMP-01 | 20.0 | 45 |
| INV-01 | 32.2 | 40 |
| INV-02 | 32.7 | 60 |
| INV-03 | 41.7 | 40 |
| INV-04 | 38.2 | 40 |
| INV-05 | 30.0 | 50 |
| INV-06 | 29.2 | 50 |
| INV-07 | 37.5 | 60 |
| INV-08 | 32.5 | 80 |
| INV-09 | 28.4 | 50 |
| INV-10 | 24.7 | 50 |
| INV-11 | 25.0 | 50 |
| INV-12 | 25.5 | 50 |
| INV-13 | 25.7 | 50 |
| INV-14 | 19.8 | 55 |
| INV-15 | 33.4 | 45 |
| INV-16 | 34.4 | 60 |
| INV-17 | 44.5 | 50 |
| INV-18 | 32.0 | 50 |

From Table 7 it is clear that the comparative inks with a typical commercial Type II amine co-initiators (COMP-01) and all the inventive inks (INV-01 to INV-18) comprising the co-initiators COINI-01 to COINI-18 have a comparable curing speed and an acceptable viscosity.

Example 4

Example 4 illustrates the effect of the oligomeric or polymeric amine co-initiators according to the present invention on the curing speed of curable compositions comprising a type I photo-initiator.

TABLE 8

| wt % of: | COMP-02 | INV-19 | INV-20 | INV-21 | INV-22 |
|---|---|---|---|---|---|
| Darocur TPO | 10.00 | 10.00 | 10.00 | 10.00 | 10.00 |
| PBlue15:4 | 3.00 | 3.00 | 3.00 | 3.00 | 3.00 |
| Solsperse 39000 | 3.00 | 3.00 | 3.00 | 3.00 | 3.00 |
| Solsperse 5000 | 0.08 | 0.08 | 0.08 | 0.08 | 0.08 |
| Genorad 16 | 1.00 | 1.00 | 1.00 | 1.00 | 1.00 |
| Craynor CN386 | 10.00 | X | x | x | X |
| COINI-05 | X | 11.50 | x | x | X |
| COINI-06 | X | X | 13.20 | x | X |
| COINI-15 | X | X | x | 12.70 | 3.30 |
| DPGDA | 72.92 | 71.42 | 39.72 | 70.22 | 79.62 |

| wt % of: | INV-23 | INV-24 |
|---|---|---|
| Darocur TPO | 10.00 | 10.00 |
| PBlue15:4 | 3.00 | 3.00 |
| Solsperse 39000 | 3.00 | 3.00 |
| Solsperse 5000 | 0.08 | 0.08 |
| Genorad 16 | 1.00 | 1.00 |
| COINI-17 | 8.50 | X |
| COINI-18 | X | 6.90 |
| DPGDA | 74.42 | 76.02 |

The inkjet ink compositions were coated on an unsubbed 100 μm PET substrate, using a bar coater and a 10 μm wired bar. Each coated layer was cured on a Fusion DRSE-120 conveyer, equipped with a Fusion VPS/1600 lamp (D-bulb), which transported the samples under the UV-lamp on a conveyer belt at a speed of 20 m/min. The curing is speed was determined.

Table 9 shows the curing speed of the inkjet inks COMP-02 and INV-19 to INV-24.

TABLE 9

| Sample | curing speed |
|---|---|
| COMP-02 | >400 |
| INV-19 | 140 |
| INV-20 | 80 |
| INV-21 | 70 |
| INV-22 | 80 |
| INV-23 | 55 |
| INV-24 | 50 |

This example clearly demonstrates that the inventive co-initiators provide a high curing speed to curable compositions comprising a Type I initiator (INV-19 to INV-24) while a typically commercial co-initiator does not (COMP-02). Moreover, the inventive compositions have an acceptable viscosity.

Example 5

Example 5 illustrates the improved photoyellowing and adhesion of inkjet inks according to the present invention.
Preparation of Inkjet Inks INV-25-INV-26 and COMP-03
Preparation of a Concentrated Cyan Dispersion
First a concentrated cyan pigment dispersion, of which the composition is shown in Table 10, was prepared by mixing the pigment, the dispersant, and stabilizer in DPGDA as dispersion medium with a dissolver and treating this mixture with a NETZCH LMZ10 bead mill.

TABLE 10

| compound | content (wt %) |
| --- | --- |
| PBlue15:4 | 20.0 |
| Solsperse 35000 | 20.0 |
| Genorad 16 | 1.0 |
| DPGDA | 59.0 |

Preparation of the UV Curable Inkjet Ink

The composition of the UV curable inkjet inks UV-25, INV-26 and COMP-07 is given in Table 11. The inks were made by adding the ink components from Table 11 to the concentrated cyan pigment dispersion under stirring at room temperature. The weight % (wt. %) is based on the total weight of the radiation curable composition. Each sample comprises an equivalent amount (on molar basis of amine functionality) of co-initiator.

TABLE 11

| wt % of: | COMP-03 | INV-25 | INV-26 |
| --- | --- | --- | --- |
| Genocure EPD | 5.00 | x | X |
| COINI-14 | x | 6.30 | x |
| COINI-16 | x | x | 7.10 |
| Darocur TPO | 5.00 | 5.00 | 5.00 |
| Genocure ITX | 5.00 | 5.00 | 5.00 |
| PBlue15:4 | 3.00 | 3.00 | 3.00 |
| Solsperse 35000 | 3.00 | 3.00 | 3.00 |
| Genorad 16 | 1.00 | 1.00 | 1.00 |
| Byk UV3510 | 0.10 | 0.10 | 0.10 |
| DPGDA | 77.90 | 76.60 | 75.80 |

The inkjet ink compositions were coated using a bar coater and a 10 μm wired bar. Each coated layer was cured on a Fusion DRSE-120 conveyer, equipped with a Fusion VPS/1600 lamp (D-bulb), which transported the samples under the UV-lamp on a conveyer belt at a speed of 20 m/min. For evaluation of curing speed the coating was done on an unsubbed 100 μm PET substrate.

For evaluation of the photoyellowing the coating was done on a white PE-paper and the b*-value of the coating was measured 24 hours after coating. For adhesion two different types of polypropylene substrates were used.

The curing speed and photoyellowing of the inkjet inks are given in Table 12.

TABLE 12

| sample | curing speed | B*-value |
| --- | --- | --- |
| COMP-03 | 45 | −45.5 |
| INV-25 | 45 | −50.5 |
| INV-26 | 45 | −51.8 |

The b*-value of the cyan pigmented coating becomes clearly more yellow (less negative b*-value) in the case of the comparison composition COMP-03, compared to the inventive samples INV-25 and INV-26.

The results of the adhesion tests are given in Table 13.

TABLE 13

| sample | adhesion PP1 | adhesion PP2 |
| --- | --- | --- |
| COMP-03 | 5 | 5 |
| INV-25 | 3 | 4 |
| INV-26 | 1 | 3 |

The legend of the polypropylene substrates is the following:

PP1=polypropylene substrate for which Priplak™ Classic available from ANTALIS, Belgium and manufactured by PRIPLAK, France PP2=BuplexPP 3 mm from BührmannUbbens BV (The Netherlands)

The comparison sample COMP-03 shows strong photoyellowing (Table 12) and very poor adhesion on polypropylene substrates (Table 13). The inventive samples INV-25 and INV-26 deliver improvements for both photoyellowing (Table 12) and adhesion (Table 13), with a curing speed which is the same as for COMP-03.

The invention claimed is:

1. A radiation curable composition comprising a curable compound, a photo-initiator and a co-initiator, wherein the co-initiator is an oligomer or a polymer, the oligomer or polymer having at least two tertiary amines in its repeating unit, the oligomer or polymer being obtained by the polycondensation of a Michael acceptor having two or oligo number of activated double bonds with an amine according to Formula I having an aliphatic primary amino group and an aliphatic tertiary amino group,

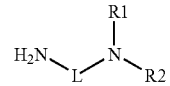

Formula I wherein

L is a divalent linking group positioning the aliphatic primary amino group and the aliphatic tertiary amino group of the amine according to Formula I in a 1-3 to 1-10 position;

R1 and R2 independently represent an optionally substituted alkyl group, an optionally substituted alkenyl group, an optionally substituted alkynyl group, or an optionally substituted (hetero)alkaryl group;

R1 and R2 may represent the necessary atoms to form a ring; or

R1 or R2 may represent the necessary atoms to form a ring with any of the atoms of L;

and/or with an amine according to Formula II having two secondary aliphatic amino groups,

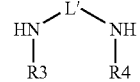

Formula II wherein

L' is a divalent linking group positioning the two aliphatic secondary amino groups of the amine according to Formula II in a 1-3 to 1-10 position;

R3 and R4 independently represent an optionally substituted alkyl group, an optionally substituted alkenyl group, an optionally substituted alkynyl group, or an optionally substituted (hetero) alkaryl group; and R4 may represent the necessary atoms to form a ring; or R3 or R4 may represent the necessary atoms to form a ring with any of the atoms of L'.

2. The radiation curable composition according to claim 1, wherein the Michael acceptor is selected form the group consisting of (meth)acrylates, (meth)acrylamides, vinyl sulfones, vinyl phosphonates, vinyl sulfonates, vinyl sulfonamides, maleimides, vinyl nitriles and vinyl ketones, vinyl aldehydes and vinyl sulfoxides.

3. The radiation curable composition according to claim 2, wherein the Michael acceptor is a vinyl sulfone or (meth)acrylate.

4. The radiation curable composition according to claim 3, wherein the divalent linking groups L and L' in Formulae I and II are C2 to C6 aliphatic divalent linking groups.

5. The radiation curable composition according to claim 4, wherein the R1 to R4 in Formulae I and II represent a C1 to C5 alkyl group.

6. The radiation curable composition according to claim 5, wherein the aliphatic tertiary amino group of the amine of Formula I comprises a piperazine or morpholine moiety.

7. The radiation curable composition according to claim 6, wherein the curable compound is a vinyl ether acrylate.

8. The radiation curable composition according to claim 5, wherein the curable compound is a vinyl ether acrylate.

9. The radiation curable composition according to claim 4, wherein the aliphatic tertiary amino group of the amine of Formula I comprises a piperazine or morpholine moiety.

10. The radiation curable composition according to claim 1, wherein the co-initiator has a Molecular Weight (Mw) of from 2400 to 25000.

11. The radiation curable composition according to claim 1, wherein the divalent linking groups L and L' in Formulae I and II are C2 to C6 aliphatic divalent linking groups.

12. The radiation curable composition according to claim 11, wherein the R1 to R4 in Formulae I and II represent a C1 to C5 alkyl group.

13. The radiation curable composition according to claim 1, wherein the R1 to R4 in Formulae I and II represent a C1 to C5 alkyl group.

14. The radiation curable composition according to claim 1, wherein the aliphatic tertiary amino group of the amine of Formula I comprises a piperazine or morpholine moiety.

15. The radiation curable composition according to claim 1, wherein the composition further includes a second co-initiator.

16. The radiation curable composition according to claim 15, wherein the second co-initiator contains an aminobenzoate moiety.

17. The radiation curable composition according to claim 1, wherein the curable compound is a vinyl ether acrylate.

18. The radiation curable composition according to claim 1, wherein the photo-initiator is a Type I photo-initiator.

19. The radiation curable composition according to claim 18, wherein the Type I photo-initiator is an acyl phosphine oxide or bisacyl phosphine oxide.

20. The radiation curable composition according to claim 19, wherein the composition comprises a Type II photo-initiator.

21. The radiation curable composition according to claim 1, wherein the composition is a coating composition.

22. The radiation curable composition according to claim 21, wherein the coating composition is a varnish, primer or lacquer or an image recording layer.

23. The radiation curable composition according to claim 1, wherein the composition is a radiation curable inkjet ink or fluid.

24. The radiation curable composition according to claim 23, wherein the composition is an ultraviolet (UV) curable inkjet ink or fluid.

* * * * *